(12) United States Patent
Akimoto et al.

(10) Patent No.: US 9,329,548 B2
(45) Date of Patent: May 3, 2016

(54) TERMINAL APPARATUS, IMAGE FORMING SYSTEM, AND NON-TRANSITORY COMPUTER READABLE MEDIUM

(71) Applicant: FUJI XEROX Co., Ltd., Minato-ku, Tokyo (JP)

(72) Inventors: Nana Akimoto, Kanagawa (JP); Kei Asada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/267,495

(22) Filed: May 1, 2014

(65) Prior Publication Data

US 2015/0023683 A1 Jan. 22, 2015

(30) Foreign Application Priority Data

Jul. 22, 2013 (JP) ................................. 2013-151862

(51) Int. Cl.
*G03G 15/00* (2006.01)
*G06F 3/12* (2006.01)

(52) U.S. Cl.
CPC ........ *G03G 15/5016* (2013.01); *G03G 15/5083* (2013.01); *G06F 3/1206* (2013.01); *G06F 3/1228* (2013.01); *G06F 3/1232* (2013.01); *G06F 3/1247* (2013.01); *G06F 3/1288* (2013.01); *G03G 2215/00113* (2013.01)

(58) Field of Classification Search
CPC .................................................. G03G 15/5016
See application file for complete search history.

(56) References Cited

U.S. PATENT DOCUMENTS

| 6,353,482 | B1 | 3/2002 | Abe et al. | |
|---|---|---|---|---|
| 6,734,912 | B1 * | 5/2004 | Kanayama et al. | 348/361 |
| 2002/0083121 | A1 * | 6/2002 | Chang et al. | 709/201 |
| 2003/0231341 | A1 * | 12/2003 | Aichi et al. | 358/1.15 |
| 2014/0064718 | A1 * | 3/2014 | Imafuji et al. | 396/155 |

FOREIGN PATENT DOCUMENTS

| JP | 07-200200 A | 8/1995 |
|---|---|---|
| JP | 2004-151816 A | 5/2004 |
| JP | 2012-073918 A | 4/2012 |
| JP | 2012-160009 A | 8/2012 |
| JP | 2012-168807 A | 9/2012 |
| JP | 2012-185742 A | 9/2012 |

* cited by examiner

*Primary Examiner* — Clayton E Laballe
*Assistant Examiner* — Noam Reisner
(74) *Attorney, Agent, or Firm* — Sughrue Mion, PLLC

(57) ABSTRACT

A terminal apparatus includes a driver. The driver includes a switching unit and has a dedicated mode and a standard mode, the dedicated mode making it possible to use all functions of a predetermined image forming apparatus, the standard mode making it possible to use a function common for plural image forming apparatuses. The switching unit performs switching from the dedicated mode to the standard mode in a case where it is determined that the dedicated mode is inapplicable after the dedicated mode has been started up.

7 Claims, 13 Drawing Sheets

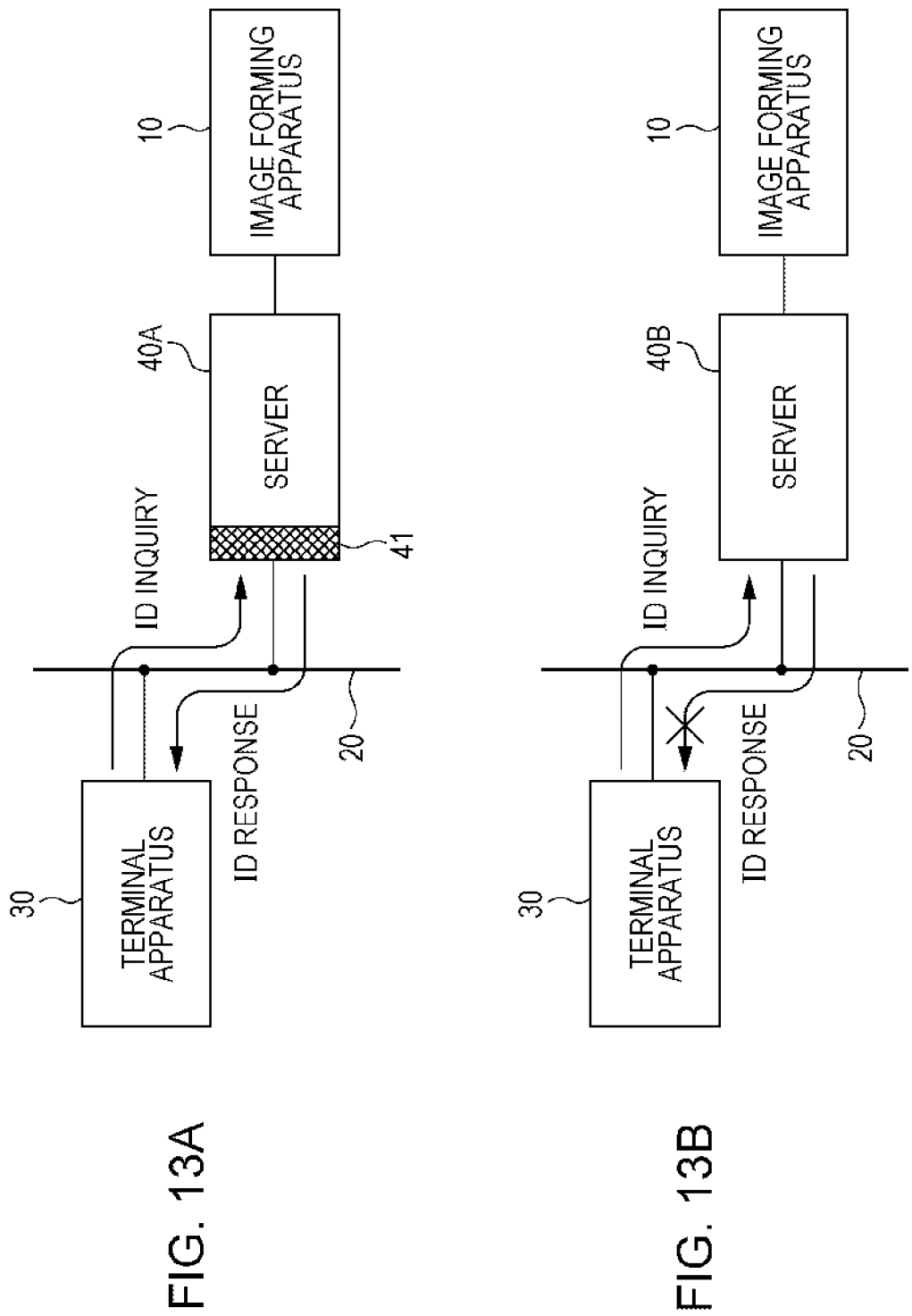

TERMINAL APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-151862 filed Jul. 22, 2013.

BACKGROUND

Technical Field

The present invention relates to a terminal apparatus, an image forming system, and a non-transitory computer readable medium.

SUMMARY

According to an aspect of the invention, there is provided a terminal apparatus including a driver. The driver includes a switching unit and has a dedicated mode and a standard mode, the dedicated mode making it possible to use all functions of a predetermined image forming apparatus, the standard mode making it possible to use a function common for plural image forming apparatuses. The switching unit performs switching from the dedicated mode to the standard mode in a case where it is determined that the dedicated mode is inapplicable after the dedicated mode has been started up.

BRIEF DESCRIPTION OF THE DRAWINGS

Exemplary embodiments of the present invention will be described in detail based on the following figures, wherein:

FIGS. 13A and 13B are diagrams for describing the case where a server is arranged between an image forming apparatus and a terminal apparatus, FIG. 13A illustrating the case where the terminal apparatus and the server are densely coupled to each other and the server may return ID of the image forming apparatus in response to an ID inquiry, FIG. 13B illustrating the case where the terminal apparatus and the server are loosely coupled to each other and the server may not return ID of the image forming apparatus in response to an ID inquiry.

DETAILED DESCRIPTION

In the following, exemplary embodiments of the invention will be described in detail with reference to the attached drawings.

First Exemplary Embodiment

Image Forming System

Figure 1:
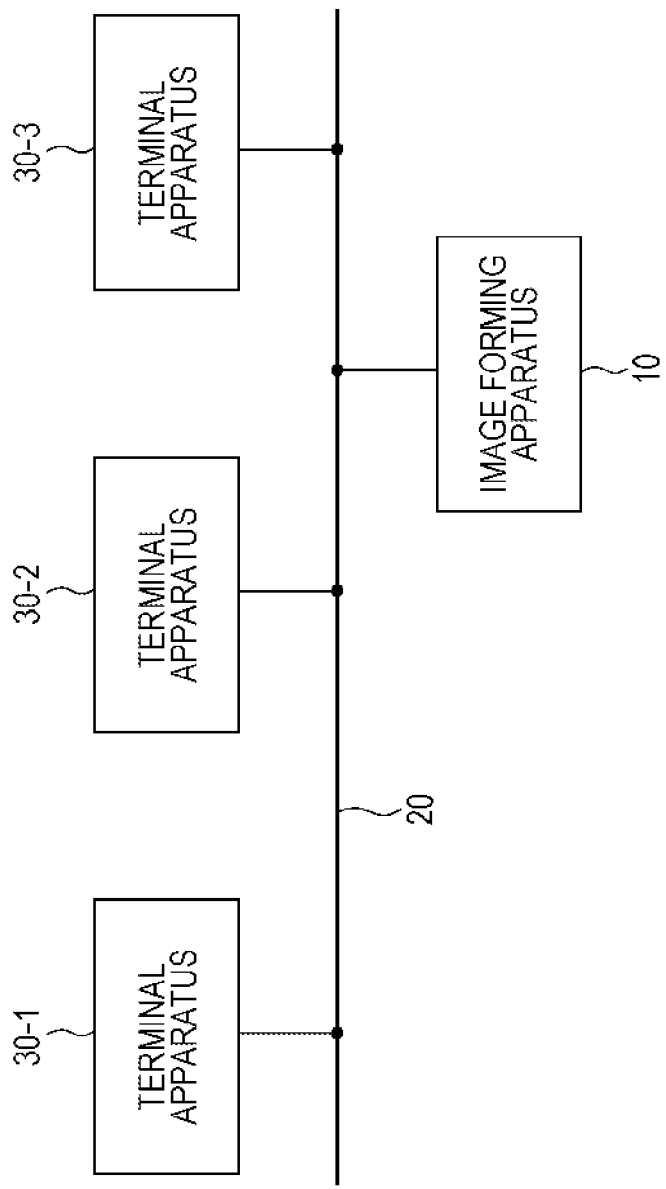
FIG. 1 is a diagram illustrating an example of an image forming system to which a first exemplary embodiment is applied.

FIG. 1 is a diagram illustrating an example of an image forming system to which the first exemplary embodiment is applied.

The image forming system includes an image forming apparatus 10 with an image forming (printing) function, a communication line 20 connected to the image forming apparatus 10, and plural terminal apparatuses 30-1, 30-2, and 30-3 connected to the communication line 20. The terminal apparatuses 30-1, 30-2, and 30-3 are operated by respective users and documents, drawings, tables, and the like may be created. Created documents, drawings, tables, and the like may be formed (printed) by the image forming apparatus 10 on recording members such as sheets (hereinafter referred to as sheets).

Here, in the case where the terminal apparatuses 30-1, 30-2, and 30-3 do not need to be distinguished from each other, the terminal apparatuses 30-1, 30-2, and 30-3 are referred to as terminal apparatuses 30. Furthermore, documents, drawings, tables, and the like created in the terminal apparatus 30 are referred to as images. Data of images transmitted from the terminal apparatus 30 to the image forming apparatus 10 via the communication line 20 is referred to as image data.

Here, the communication line 20 includes a local area network (LAN), a wide area network (WAN), lines for the Internet, and a telephone line. In addition, the communication line 20 may be a line via Universal Serial Bus (USB) or IEEE 1284.

A terminal apparatus 30 includes, for example, a personal computer (PC). The terminal apparatus 30 is controlled by an operating system (OS) (an OS 351 in FIG. 2, which will be described later). A user creates an image by operating an application that operates on an OS such as a document creation software program, a drawing creation software program, and a spreadsheet software program (an application 352 in FIG. 2, which will be described later).

When a user commands "print" or the like on an application operating in the terminal apparatus 30, image data is transmitted from the terminal apparatus 30 to the image forming apparatus 10 via the communication line 20. An image is formed on a sheet by the image forming apparatus 10.

In FIG. 1, as an example, the image forming system includes three terminal apparatuses 30; however, the number of terminal apparatuses 30 included in the image forming system is not limited to three and may be a certain number other than three. In addition, as an example, the image forming system includes one image forming apparatus 10; however, plural image forming apparatuses 10 may also be included.

Note that, in the first exemplary embodiment, it is necessary for the image forming system to include at least one image forming apparatus 10 and one terminal apparatus 30. Thus, the following description is made, supposing that the image forming system includes one image forming apparatus 10 and one terminal apparatus 30.

Figure 2:
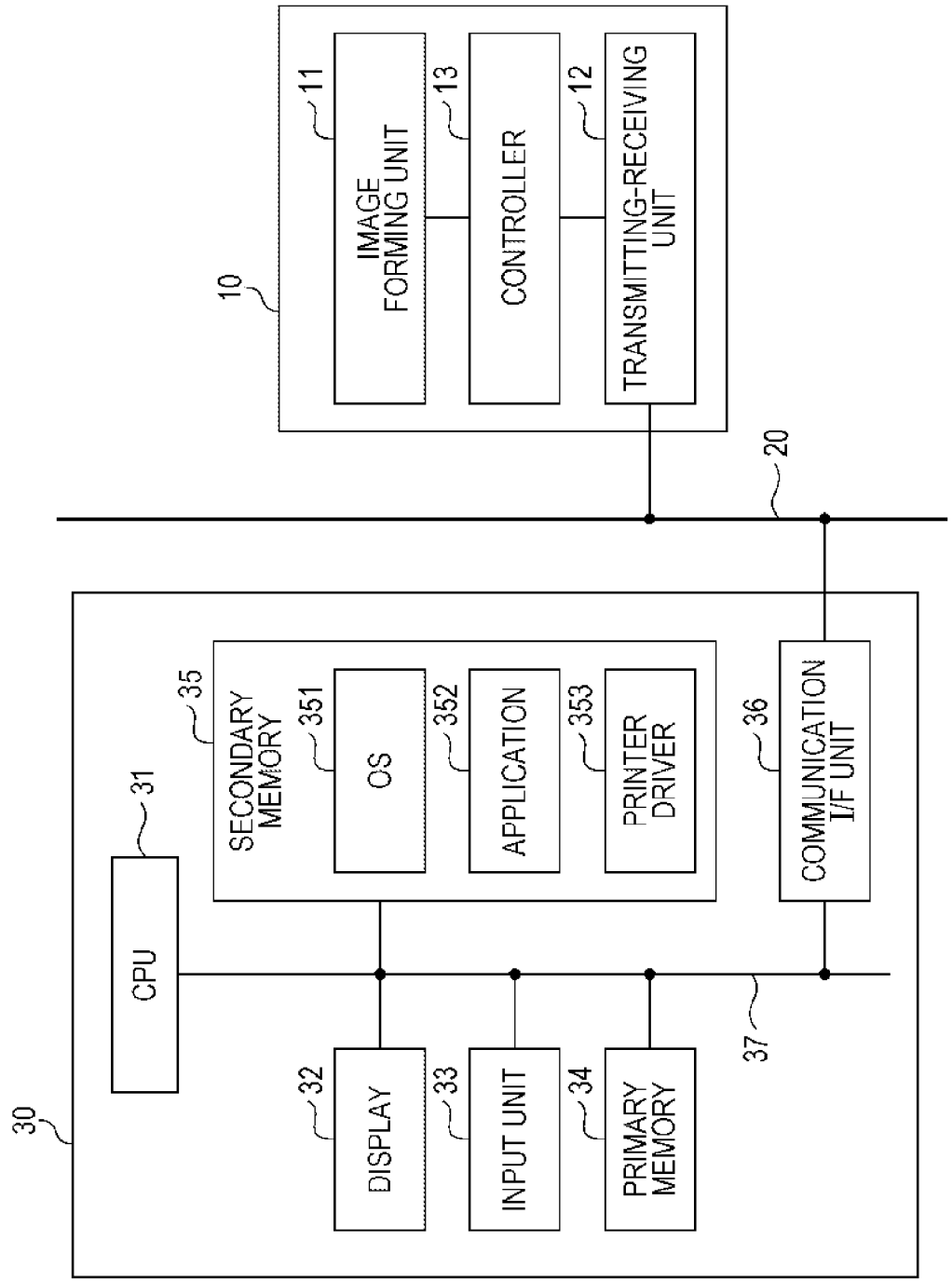
FIG. 2 is a diagram illustrating an example of the configuration of an image forming apparatus and an example of the configuration of a terminal apparatus.

FIG. 2 is a diagram illustrating an example of the configuration of the image forming apparatus 10 and an example of the configuration of the terminal apparatus 30.

The image forming apparatus 10 includes an image forming unit 11, a transmitting-receiving unit 12, and a controller 13. The image forming unit 11 is an example of an image forming unit that forms an image on a sheet. The transmitting-receiving unit 12 is an example of a receiving unit that is connected to the communication line 20 and transmits and receives image data to and from the terminal apparatus 30. The controller 13 is an example of a responding unit that controls an operation of the image forming unit 11, that of the transmitting-receiving unit 12, and the like.

The image forming unit 11 may use a method in which a latent image is formed with a laser beam, a light-emitting diode (LED), or the like on a photoconductor drum and an image is formed on a sheet by developing the latent image with a toner and transferring the image onto the sheet. Alternatively, the image forming unit 11 may use a method in which an image is formed on a sheet by performing inkjet printing.

Note that the image forming apparatus 10 further includes an image reader that reads an image formed on a sheet, and a UI. The UI receives a command associated with an operation from a user and is an example of a notifying unit such as a display that displays a message for a user, and a speaking unit that outputs an alarm, speech, and sound. The image forming apparatus 10 may also be a so-called multifunction machine with a scanning function, a copying function, and a facsimile function as well as a printing function. In this case, in addition to the printing function of the image forming unit 11, the scanning function is executed by the image reader, the copying function is executed by the image reader and the image forming unit 11, and the facsimile function is executed by the image reader, the transmitting-receiving unit 12, and the image forming unit 11.

In contrast, the terminal apparatus 30 includes a central processing unit (CPU) 31, a display 32, an input unit 33, a primary memory 34, a secondary memory 35, and a communication interface (I/F) unit 36. The CPU 31 executes a logical operation and an arithmetic operation. The display 32 displays an operation result and the like for a user. The input unit 33 receives commands, data, and the like from a user. The primary memory 34 stores programs, data, and the like used in processing executed by the CPU 31. The secondary memory 35 stores the OS 351, the application 352, a printer driver 353, and the like. The communication I/F unit 36 is connected to the communication line 20, transmits created image data, and receives a response from the image forming apparatus 10. Furthermore, the terminal apparatus 30 includes a bus 37 connected to each of the CPU 31, the display 32, the input unit 33, the primary memory 34, the secondary memory 35, and the communication I/F unit 36. The bus 37 is used to transmit and receive programs, data, and the like to and from the CPU 31, the display 32, the input unit 33, the primary memory 34, the secondary memory 35, and the communication I/F unit 36. Note that the communication I/F unit 36 is an example of a transmitting unit.

An example of the display 32 is a liquid crystal display. The display 32 displays, for a user, an operation result obtained by the CPU 31, an image created by a user, or the like.

Examples of the input unit 33 include a keyboard, a mouse, a tablet, and a touch screen. Commands to the terminal apparatus 30 (the CPU 31), data for creation of an image, and the like are input to the input unit 33 by a user.

The primary memory 34 includes a storage member (memory) capable of being accessed at a high speed, such as a dynamic random access memory (DRAM). The primary memory 34 stores programs, data, and the like in a state (an expanded state) in which the CPU 31 may access (execute) the programs, data, and the like.

The secondary memory 35 includes a non-volatile storage member (memory) having a large capacity, such as a hard disk drive (HDD), a read-only memory (ROM), and a flash ROM. Here, the non-volatile storage member (memory) is capable of storing information under no power supply. The secondary memory 35 stores the OS 351, the application 352, the printer driver 353, and the like.

The OS 351 is a basic software program. The OS 351 is loaded in the primary memory 34 and executed by the CPU 31, thereby controlling the terminal apparatus 30. Examples of the application 352 include a document creation software program, a drawing creation software program, and a spreadsheet software program. Upon reception of a user's command, the application 352 is loaded in the primary memory 34 by the CPU 31 and operates on the OS 351. A user creates an image by operating the application 352.

The printer driver 353 operates on the OS 351, and is a program that converts an image created by a user operating the application 352 into image data of a format in which the image forming apparatus 10 is capable of forming an image on a sheet. Note that the image data is stored in the primary memory 34.

In order to save memory space in the secondary memory 35, the OS 351, the application 352, the printer driver 353, and the like stored in the secondary memory 35 may also be stored (saved) in a compression format (state).

The communication I/F unit 36 transmits image data stored in the primary memory 34 to the image forming apparatus 10. In addition, the communication I/F unit 36 receives a response (signal) from the image forming apparatus 10.

Next, an operation of the image forming apparatus 10 and that of the terminal apparatus 30 will be described.

In the terminal apparatus 30, when power is switched on, the CPU 31, the display 32, the input unit 33, the primary memory 34, and the communication I/F unit 36 are initialized (reset).

Thereafter, the CPU 31 reads (loads) the OS 351 from the secondary memory 35, and writes the OS 351 in an executable format into the primary memory 34. That is, in the case where the OS 351 is stored in a compression format in the secondary memory 35, the compressed OS 351 is expanded (decompressed) and the decompressed OS 351 is written into the primary memory 34.

Thereafter, the CPU 31 executes the OS 351 from a predetermined address of the primary memory 34 into which the OS 351 has been written. As a result, the terminal apparatus 30 enters an operating state.

When a user creates an image, the user performs, from the input unit 33, an operation for creation of an image. The CPU 31 reads (loads), from the secondary memory 35, the application 352 to be used by the user for creation of an image. Similarly to as in the case of the OS 351, the CPU 31 writes the application 352 in an executable format into the primary memory 34 and executes the application 352 (the application 352 is caused to enter an operating state).

The user operates the application 352 written into the primary memory 34 and creates an image.

Next, in the case where the created image is formed on a sheet by the image forming apparatus 10, the user selects "print" using the input unit 33 on, for example, a document creation software program. That is, at the terminal apparatus 30, the user commands image forming to be performed by the image forming apparatus 10.

The CPU 31 reads (loads) the printer driver 353 from the secondary memory 35, writes the printer driver 353 in an executable format into the primary memory 34, and executes the printer driver 353 (the printer driver 353 is caused to enter an operating state).

Thereafter, the printer driver 353 converts the image created by the user into image data of a format processable by the image forming apparatus 10. Note that this conversion is performed on the primary memory 34, and the image data is also stored in the primary memory 34. The image data acquired as a result of the conversion is transmitted to the communication I/F unit 36 via the bus 37 and to the transmitting-receiving unit 12 of the image forming apparatus 10 via the communication line 20.

In the image forming apparatus 10, the transmitting-receiving unit 12 transmits the received image data to the controller 13. The controller 13 performs, on the image data, predetermined image processing such as shading correction, displacement correction, brightness/color space conversion, gamma correction, frame deletion, color editing, and movement editing, and transmits the resulting image data to the image forming unit 11. The image forming unit 11 forms an image on a sheet on the basis of the image data on which image processing has been performed.

Here, the image data transmitted from the terminal apparatus 30 to the image forming apparatus 10 needs to be in a format in which the controller 13 of the image forming apparatus 10 is capable of performing predetermined image processing on the image data.

That is, the printer driver 353 describes an image created by a user in a predetermined page description language (PDL). In addition to this, the printer driver 353 adds, to the image described in the predetermined PDL, a control command for controlling the image forming apparatus 10 and commands for screen/halftone processing, a (color) gamut conversion table, and the like, and then converts the resulting image into image data. An example of the control command is information on the type, size, and the like of a sheet on which an image is to be formed. The gamut conversion table is made on the basis of color characteristics of the image forming apparatus 10.

Note that a control command and the like that are not information used to directly describe an image are added to a front portion of image data. An example of such a language used to describe information such as a control command is a Printer Job Language (PJL).

When the image data transmitted from the terminal apparatus 30 to the image forming apparatus 10 is described in a PDL compatible with the image forming apparatus 10 and a control command is valid for the image forming apparatus 10, an image formed on a sheet by the image forming apparatus 10 is the image created by the user in the terminal apparatus 30. That is, the user's intended image is formed on the sheet.

However, when the image data transmitted from the terminal apparatus 30 to the image forming apparatus 10 is described in a PDL incompatible with the image forming apparatus 10 or when a control command is not valid for the image forming apparatus 10, an image formed on a sheet by the image forming apparatus 10 differs from the image created by the user in the terminal apparatus 30. That is, an image that is not the user's intended image is formed on the sheet.

This occurs in the case where the printer driver 353 of the terminal apparatus 30 is incompatible with the image forming apparatus 10, which is connected.

For example, this occurs in the case where the image forming apparatus 10 is switched to (replaced with) another product (for example, a newly released product) and when the printer driver 353 of the terminal apparatus 30 is not switched to a printer driver compatible with the other product. This occurs in the case where a user of the terminal apparatus 30 is not an administrator of the image forming apparatus 10 and does not know (has not recognized) that the image forming apparatus 10 has been switched to the other product.

In the above-described case, upon receiving the image data, the transmitting-receiving unit 12 of the image forming apparatus 10 transmits, to the controller 13, even image data converted by the printer driver 353 that is incompatible with the image forming apparatus 10. The controller 13 executes image processing on received image data in accordance with a preset procedure. The image forming unit 11 forms an image on a sheet.

That is, even in the case of the image data converted by the printer driver 353 that is incompatible with the image forming apparatus 10, an image is formed on a sheet (a printing error occurs).

In the case where images are formed on a large number of sheets, a lot of sheets and time are wasted.

Furthermore, even when the user becomes aware that the image formed on the sheet differs from the image created in the terminal apparatus 30, the user tends not to notice that the printer driver 353 is the cause of the printing error. Thus, the user does not easily come to think of switching the printer driver 353 of the terminal apparatus 30 to a printer driver compatible with the image forming apparatus 10.

Thus, in order to address such an issue, the user ends up making an inquiry to a division that manages the image forming apparatus 10 or to a maintenance service company for the image forming apparatus 10.

In this manner, in order to address an issue that has arisen when the image forming apparatus 10 is switched to the other product, the user, the division that manages the image forming apparatus 10, the maintenance service company for the image forming apparatus 10, and the like end up wasting a lot of efforts and time.

For this reason, the printer driver 353 to which the first exemplary embodiment is applied has a dedicated mode and a standard mode. In the dedicated mode, images may be converted into image data in a state in which all the functions of a predetermined image forming apparatus 10 may be selected and settings for all the functions may be set. In the standard mode, images may be converted into image data in a state in which functions that are common for plural predetermined image forming apparatuses 10 may be selected and settings for the functions may be set. Note that when the dedicated mode and the standard mode do not need to be distinguished from each other, the dedicated mode and the standard mode are referred to as modes.

Figure 3:
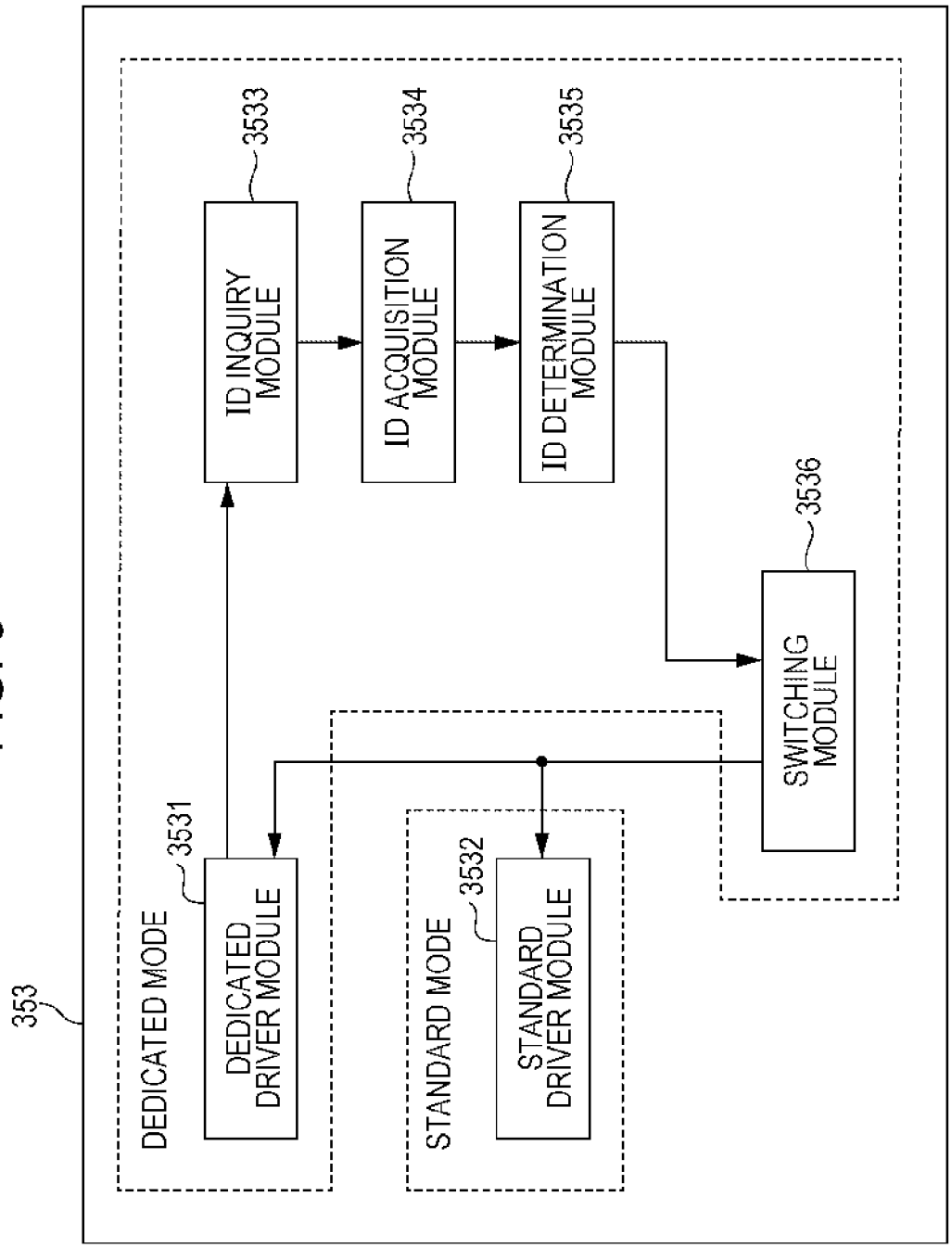
FIG. 3 is a diagram illustrating an example of the configuration of a functional module (a block) in a printer driver to which the first exemplary embodiment is applied.

FIG. 3 is a diagram illustrating an example of the configuration of a functional module (a block) in the printer driver 353 to which the first exemplary embodiment is applied. The printer driver 353 includes a UI (a UI screen, which will be described later as a dedicated UI screen 321 illustrated in FIG. 5A), a dedicated driver module 3531, a UI (a UI screen, which will be described later as a standard UI screen 322 illustrated in FIG. 5B), and a standard driver module 3532. The printer driver 353 is provided as a single printer driver. The UI (a UI screen, which will be described later as the dedicated UI screen 321 illustrated in FIG. 5A) optimizes, in accordance with a model type to be used, and displays a group of functions (print setting functions) through which print settings may be set in the dedicated mode, prohibited rules between the print setting functions, and the like. The dedicated driver module 3531 is an example of an output unit that converts a drawing command for the application 352 (a drawing command in the case of a PDL) into image data optimized for a model type to be used and into a device control command on the basis of the print setting functions specified through the UI or by the application 352. In the standard mode, the UI (a UI screen, which will be described later as the standard UI screen 322 illustrated in FIG. 5B) displays such that the group of functions (print setting functions) through which print settings may be set, prohibited rules between the print setting functions, and the like may be applied for common use in plural model types. The standard driver module 3532 converts a drawing command for the application 352 on the basis of the print setting functions specified through the UI or by the application 352 into image data that may be printed by any of the plural model types (a drawing command in the case of a PDL). Note that, in the case where the dedicated driver module 3531 and the standard driver module 3532 do not need to be distinguished from each other, the dedicated driver module 3531 and the standard driver module 3532 are referred to as driver modules.

Here, the dedicated driver module 3531 has a function for converting an image into image data, a function for displaying a user interface (the dedicated UI screen 321 of FIG. 5A to be described later) corresponding to the dedicated driver module 3531 on the display 32, a function for adding a control command to image data in accordance with a command input from the input unit 33 through a UI screen, and a function for transmitting image data to the image forming apparatus 10. The standard driver module 3532 also has a function for displaying a user interface (the standard UI screen 322 of FIG. 5B to be described later) corresponding to the standard driver module 3532 on the display 32, a function for adding a control command to image data in accordance with a command input from the input unit 33 through a UI screen, and a function for transmitting image data to the image forming apparatus 10.

Note that, a drawing command is a command for forming an image on a sheet, and examples of the drawing command include a command for drawing a point, a command for placing a raster image (a series of colored dots), a command for specifying the color and thickness of a line, and a command for filling an area. The image forming apparatus 10 first draws an image in a page buffer on the basis of these commands, and forms the image drawn in the page buffer onto a sheet.

A device control command is a control command other than the above-described drawing commands, and examples of the device control command include a command for selecting a sheet tray, a command for selecting a sheet type, a command for selecting double-side printing/single-side printing, a command for stapling sheets, a command for folding one or more sheets, a command for performing processing for smoothing boundaries in graphics, and a command associated with storing.

The printer driver 353 includes an ID inquiry module 3533, an ID acquisition module 3534, an ID determination module 3535, and a switching module 3536. The ID inquiry module 3533 is an example of a requesting unit that inquires of the image forming apparatus 10 about identification information (hereinafter referred to as ID). The ID acquisition module 3534 is an example of an acquisition unit that receives and acquires ID from the image forming apparatus 10. The ID determination module 3535 is an example of a determination unit that determines acquired ID. The switching module 3536 is an example of a switching unit that switches driver modules.

Here, the image forming apparatuses 10 each have ID. ID has only to be information that makes it possible to identify an image forming apparatus 10 corresponding to the ID. ID may be information on a model type or on specifications. Here, specifications refer to functions and the like that are common for plural model types. In the case where, for each of model types or specifications of the image forming apparatuses 10, a PDL compatible with the model type or specification is set, ID may also be information on the PDL compatible with the model type or specification. Note that in the case where, for the image forming apparatuses 10 of the same model type or of the same specifications, compatible PDLs differ from image forming apparatus to image forming apparatus, ID may also be a combination of a model type or specifications and a PDL.

In addition, ID may also be information on image forming processing performance, or a type of sheets, a sheet size, or the like that may be used.

Furthermore, ID may also include plural pieces of information.

In the following, description will be made, supposing that ID refers to, for example, a model type of an image forming apparatus 10.

Dedicated Mode and Standard Mode

The dedicated mode and the standard mode will be described. In the dedicated mode, as described later, the dedicated driver module 3531, the ID inquiry module 3533, the ID acquisition module 3534, the ID determination module 3535, and the switching module 3536 operate. In contrast, in the standard mode, the standard driver module 3532 operates.

The dedicated driver module 3531 is configured such that, in the case of a newly developed image forming apparatus 10 (a new product), performance/quality may be maximized in a state in which all the unique functions that a predetermined image forming apparatus 10 has may be selected and settings may be set for all the unique functions. For example, examples of the unique functions include a print function for reducing an amount of toner to be used and a stapling function. In addition, also about a parameter that may be adjusted for each image forming apparatus 10, an appropriate parameter may be selected in relation to a model type and other print settings, the parameter being used for tone, screen, or smoothing processing.

The dedicated driver module 3531 stores ID of an image forming apparatus 10 corresponding to the dedicated mode as predetermined identification information used to identify the image forming apparatus 10.

Note that, since there are many image forming apparatuses that need to be supported, there may be, in actuality, plural dedicated driver modules for each of the image forming apparatuses. In the case where there are plural image forming apparatuses corresponding to a dedicated mode, for each of the image forming apparatuses, "dedicated modes" of the image forming apparatus may be shown for a user. Each of the "dedicated modes" may also be associated with image forming apparatuses serving as sub choices of the dedicated mode.

In contrast, the standard driver module 3532 is a driver module that may handle image forming apparatuses 10 of plural model types. For example, the standard driver module 3532 is configured to make it possible to select functions that are common for the newly developed image forming apparatus 10 and the image forming apparatuses 10 that have been provided so far and to set settings for the functions. Note that the functions do not have to be functions that are common for all the image forming apparatuses 10 that have been provided so far, and may be functions that are common for predetermined image forming apparatuses 10.

Functions that are common for image forming apparatuses 10 are basic functions that the image forming apparatuses 10 have. An example of such a function is a function for forming an image created by a user in a terminal apparatus 30 onto a sheet. That is, functions that are common for image forming apparatuses 10 may be functions that are common for image forming apparatuses 10 of plural model types have, or may also be functions whose settings do not cause a serious failure even when image forming apparatuses 10 of some model types do not have the functions. These functions have only to be able to be selected or settings have only to be set for these functions.

Thus, in the case where an image forming apparatus 10 is switched to another image forming apparatus 10, a user may perform image forming by performing switching from the dedicated driver module 3531 to the standard driver module 3532.

The ID inquiry module 3533 inquires of an image forming apparatus 10 about ID in the case where the dedicated driver module 3531 has been started up.

The ID acquisition module 3534 acquires, in response to an inquiry about ID, ID as a response from an image forming apparatus 10 (ID of the image forming apparatus 10).

The ID determination module 3535 determines, on the basis of ID received from an image forming apparatus 10, whether or not the image forming apparatus 10 supports the dedicated mode. That is, the ID determination module 3535 compares ID received from the image forming apparatus 10 with the ID of an image forming apparatus 10 stored in the dedicated driver module 3531 and compatible with the dedicated driver module 3531. In the case where the IDs match, the ID determination module 3535 determines that the image forming apparatus 10 whose ID has been received supports the dedicated mode. In contrast, in the case where the IDs do not match, the ID determination module 3535 determines that the image forming apparatus 10 whose ID has been received does not support the dedicated mode.

The switching module 3536 performs switching from the dedicated driver module 3531 to the standard driver module 3532 in the case where the ID determination module 3535 determines that the image forming apparatus 10 whose ID has been received does not support the dedicated mode. As a result, the mode is switched from the dedicated mode to the standard mode.

Note that the printer driver 353 stores the mode (the dedicated mode or the standard mode) that is selected when operation is completed, and the printer driver 353 is started up in the stored mode at the next start-up. For example, when the printer driver 353 is closed, the last mode before the printer driver 353 is closed has only to be stored.

Operation of Printer Driver 353

Next, an operation of the printer driver 353 will be described.

Figure 4:
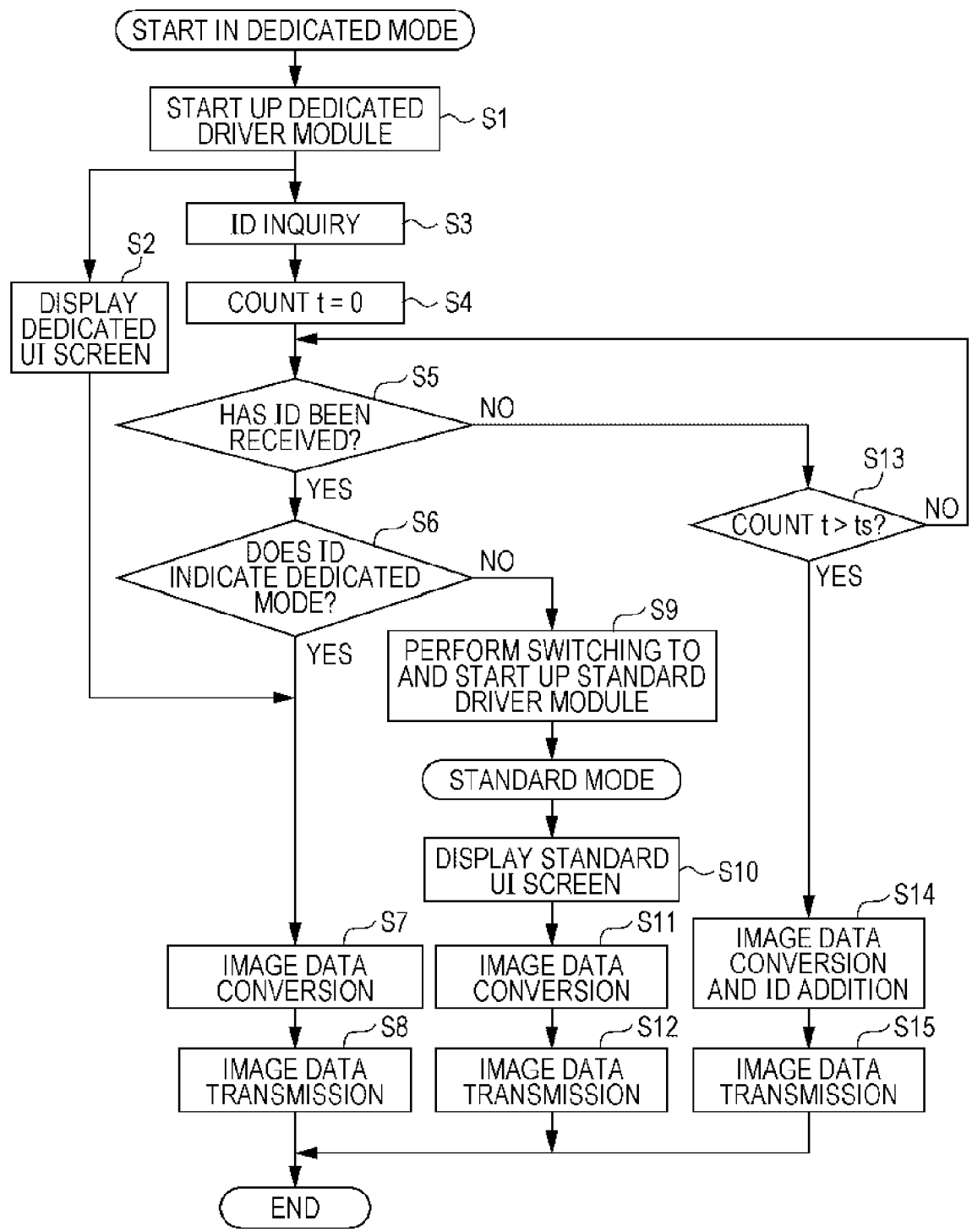
FIG. 4 is a flowchart illustrating an example of an operation of the printer driver in the first exemplary embodiment.

FIG. 4 is a flowchart illustrating an example of an operation of the printer driver 353 in the first exemplary embodiment. Here, suppose that the last mode is the dedicated mode.

Suppose that a user creates an image in the terminal apparatus 30 and commands image forming to be performed by the image forming apparatus 10.

In the following, with reference to FIG. 3, an operation of the printer driver 353 will be described using FIG. 4.

Since the last mode is the dedicated mode, the dedicated driver module 3531 in the printer driver 353 is started up. (Step 1, denoted as S1 in FIG. 4. The same applies to the other steps.)

Next, the dedicated driver module 3531 displays a UI screen for the dedicated mode on the display 32 of the terminal apparatus 30 (the dedicated UI screen 321 of FIG. 5A to be described later) (Step 2).

In addition, simultaneously with step 2, the ID inquiry module 3533 inquires of the image forming apparatus 10 about ID (Step 3) (a requesting function).

Here, a count t of a timer that counts an elapsed time is set to "0" (timer setting) (Step 4). Thereafter, the timer increases the count t as time goes on.

Next, it is determined whether or not the ID acquisition module 3534 has acquired ID from an image forming apparatus 10 (Step 5) (an acquiring function).

The case where a negative determination (No) has been made in step 5 will be described later.

In the case where a positive determination (Yes) has been made in step 5, that is, in the case where the image forming apparatus 10 has responded by transmitting ID in response to an inquiry (a request) and the ID acquisition module 3534 has received the ID, the ID determination module 3535 determines whether or not the image forming apparatus 10 supports the dedicated mode (whether or not the image forming apparatus 10 is compatible with the dedicated driver module 3531) (Step 6) (a determining function).

In the case where a positive determination (Yes) has been made in step 6, that is, in the case where the image forming apparatus 10 supports the dedicated mode, the dedicated driver module 3531 converts the image created by the user into image data (Step 7). Thereafter, the dedicated driver module 3531 transmits the image data to the image forming apparatus 10 (Step 8).

Note that in the case where the user refers to the dedicated UI screen 321 displayed on the display 32 of the terminal apparatus 30 and inputs commands for forming an image such as selection of a sheet and specification of a magnification through the input unit 33, a control command based on these commands is added to the image data.

In contrast, in the case where a negative determination (No) has been made in step 6, that is, in the case where the image forming apparatus 10 does not support the dedicated mode, switching from the dedicated driver module 3531 to the standard driver module 3532 is performed by the switching module 3536 and the standard driver module 3532 is started up (Step 9) (a switching function). As a result, the mode is switched from the dedicated mode to the standard mode.

The standard driver module 3532 closes the dedicated UI screen 321 displayed on the display 32 of the terminal apparatus 30, and displays a UI screen for the standard mode (the standard UI screen 322 of FIG. 5B to be described later) (Step 10).

Thereafter, the standard driver module 3532 converts the image created by the user into image data (Step 11). The standard driver module 3532 transmits the image data to the image forming apparatus 10 (Step 12).

UI Screen

Figure 5:
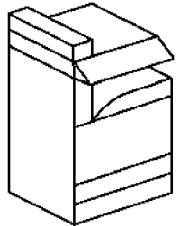
FIGS. 5A and 5B are diagrams illustrating an example of a user interface (UI) screen displayed on a display of a terminal apparatus, FIG. 5A illustrating a dedicated UI screen for a dedicated mode and FIG. 5B illustrating a standard UI screen for a standard mode.

FIGS. 5A and 5B are diagrams illustrating examples of a UI screen displayed on the display 32 of the terminal apparatus 30. FIG. 5A illustrates the dedicated UI screen 321 for the dedicated mode, and FIG. 5B illustrates the standard UI screen 322 for the standard mode.

The dedicated UI screen 321 illustrated in FIG. 5A shows a schematic diagram of the image forming apparatus 10 such that, for example, the model type of the image forming apparatus 10 is recognizable. All the functions that the image forming apparatus 10 provides may be selected and settings may be set for all the functions on the dedicated UI screen 321 illustrated in FIG. 5A.

In contrast, the standard UI screen 322 illustrated in FIG. 5B does not show a schematic diagram of the image forming apparatus 10 and functions that are common for image forming apparatuses 10 of plural model types may be selected and settings may be set for the functions on the standard UI screen 322 illustrated in FIG. 5B. That is, in comparison with the dedicated UI screen 321 illustrated in FIG. 5A, functions that may be selected and for which settings may be set are limited. As an example, a function for specifying a binding margin for binding or a printing position and a function for binding or for creating a poster are not included.

Furthermore, the user may also be caused to recognize that the standard UI screen 322 of the standard driver module 3532 is open. For example, a message window 323 may also be provided that shows a message such as "The device (the image forming apparatus 10) has been switched to another device. Images are formed in the standard mode." on the standard UI screen 322.

Furthermore, an OK button 324 and a cancel button 325 may be provided. The OK button 324 is used to give "OK" for switching the mode to the standard mode and continuation of image forming. The cancel button 325 is used to select "cancel" to cancel image forming. A user may select whether or not to continue image forming by switching the mode to the standard mode.

Note that, in the case where the user has selected "OK" on the standard UI screen 322 illustrated in FIG. 5B, steps 11 and 12 are executed after step 10 in the flowchart illustrated in FIG. 4. In contrast, in the case where the user has selected "cancel" on the standard UI screen 322 illustrated in FIG. 5B, the process of the flowchart illustrated in FIG. 4 ends without executing steps 11 and 12 (steps 11 and 12 are skipped).

As described with reference to the flowchart illustrated in FIG. 4, when the printer driver 353 is started up in the dedicated mode, the printer driver 353 starts up the dedicated driver module 3531 and inquires of the image forming apparatus 10 about ID serving as identification information used to identify the image forming apparatus 10. The printer driver 353 receives the ID from the image forming apparatus 10 and determines whether or not the image forming apparatus 10 supports the dedicated mode. In the case where the image forming apparatus 10 supports the dedicated mode, the dedicated driver module 3531 converts an image into image data.

In contrast, for example, as a result of switching the image forming apparatus 10 to another image forming apparatus 10, in the case where the other image forming apparatus 10 does not support the dedicated mode, switching is performed from the dedicated driver module 3531 to the standard driver module 3532 and the standard driver module 3532 converts an image into image data.

Thus, a user may execute image forming even when the image forming apparatus 10 is switched to the other image forming apparatus 10.

Furthermore, in the case where the mode is switched to the standard mode, a message indicating that the image forming apparatus 10 has been switched to another image forming apparatus 10 is displayed on the message window 323 arranged on the display 32 of the terminal apparatus 30. Thus, the user is notified that the printer driver 353 of the terminal apparatus 30 needs to be switched to the printer driver 353 that has a dedicated mode supported by the other image forming apparatus 10.

Even in this case, the standard driver module 3532 may be used that is also compatible with the other image forming apparatus 10. Thus, it is not necessary to interrupt image forming and to switch the printer driver 353 to another printer driver 353. That is, the user's operation is less likely to be interrupted.

Returning to FIG. 4, the case where a negative determination (No) has been made in step 5, that is, the case where ID is not received from the image forming apparatus 10 will be described.

In the case where a negative determination (No) has been made in step 5, the ID acquisition module 3534 determines whether or not the count t of the timer has exceeded a time-out count ts, which is an allowed time that has been predetermined (Step 13).

In the case where a negative determination (No) has been made in step 13, that is, in the case where the count t is smaller than or equal to the time-out count ts, the ID acquisition module 3534 waits for ID coming from the image forming apparatus 10. The process returns to step 5, and it is determined whether or not the ID acquisition module 3534 has received ID from the image forming apparatus 10.

In contrast, in the case where a positive determination (Yes) has been made in step 13, that is, in the case where the count t has exceeded the time-out count ts, the dedicated driver module 3531 converts the image into image data and the ID of the image forming apparatus 10 compatible with the dedicated driver module 3531 is added to the image data (Step 14).

Thereafter, the dedicated driver module 3531 transmits the image data to the image forming apparatus 10 (Step 15).

Figure 6:
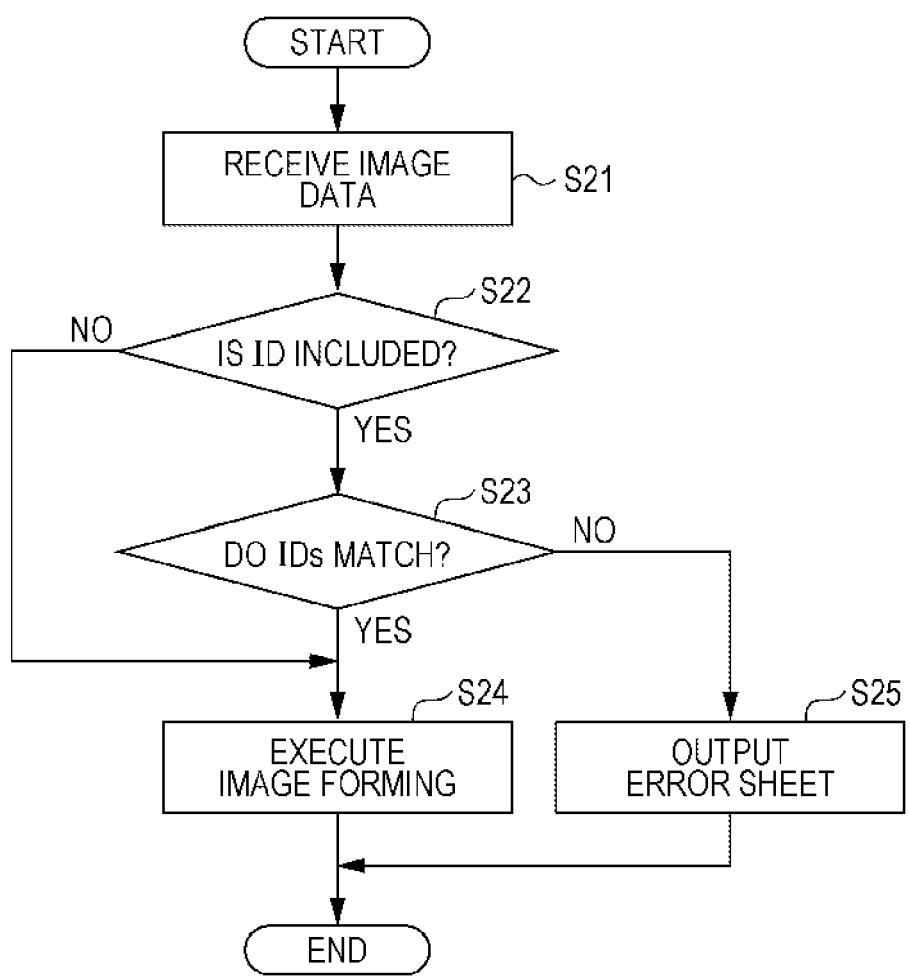
FIG. 6 is a flowchart illustrating an operation of an image forming apparatus that has received image data to which ID is added.

FIG. 6 is a flowchart illustrating an operation of the image forming apparatus 10 that has received image data to which ID has been added.

The image data transmitted from the printer driver 353 is received by the transmitting-receiving unit 12 in the image forming apparatus 10 and the received image data is transmitted to the controller 13 (Step 21).

It is determined by the controller 13 whether or not the image data includes ID (Step 22).

In the case where a positive determination (Yes) has been made in step 22, that is, in the case where the image data includes ID, the ID is extracted from the image data. Thereafter, it is determined whether or not the ID of the image data corresponds to the ID of the image forming apparatus 10 (Step 23).

In the case where a positive determination (Yes) has been made in step 23, that is, in the case where the ID of the image data corresponds to the ID of the image forming apparatus 10, the image data is processed by the controller 13 and image forming is executed by the image forming unit 11 (Step 24).

In contrast, in the case where a negative determination (No) has been made in step 23, the user is caused to recognize that the image forming apparatus 10 has been changed to another image forming apparatus 10. For example, in the case where the ID of the image data does not correspond to the ID of the image forming apparatus 10, a sheet (an error sheet) is output on which an error message "The device (the image forming apparatus) has been switched to another device. The current printer driver is incompatible with the other device." or the like has been printed by the image forming unit 11 (Step 25).

This is performed since, in the case where the ID of the image forming apparatus 10 (the ID added to the image data) compatible with the printer driver 353 does not correspond to the ID of the image forming apparatus 10 that is connected, when image forming is performed using the received image data, an image that is not the user's intended image may be formed on a sheet.

In such a case, as a result of outputting an error message, sheet wastage and time wastage caused by a printing error may be reduced and the user is notified that the printer driver 353 needs to be switched to another printer driver 353.

Figure 7:
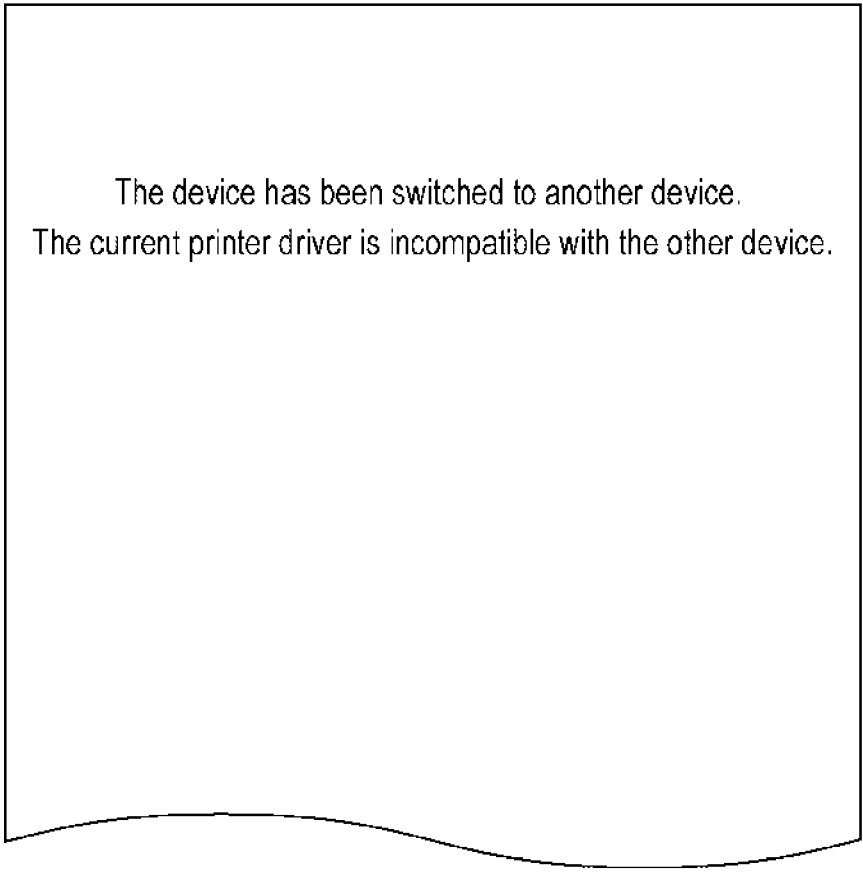
FIG. 7 is a diagram illustrating an example of an error sheet.

FIG. 7 is an example of an error sheet. Here, "The device (the image forming apparatus) has been switched to another device. The current printer driver is incompatible with the other device." is an example of an error message to be printed on an error sheet. However, information useful for the user to switch the printer driver 353 to another printer driver 353 may also be added. Examples of such information include a number (a version number or the like) of the printer driver 353 compatible with the image forming apparatus 10 and information on an acquisition source (a server) of the printer driver 353.

In addition, the user may also be caused to recognize, through a UI of the image forming apparatus 10, that the image forming apparatus 10 has been switched to another image forming apparatus 10. An error message may also be displayed on a display, which is a UI, an error message may also be output by speech from a speaker, which is a UI, and an alarm may also be output.

That is, a user of the image forming apparatus 10 has only to be able to recognize that the image forming apparatus 10 has been switched to another image forming apparatus 10.

Returning back to FIG. 6, in the case where a negative determination (No) has been made in step 22, that is, in the case where the image data does not include ID, the process proceeds to step 24 and image forming is executed.

This is because, in the case where the count t of the timer has exceeded the time-out count is in step 13 of FIG. 4, ID is added to the image data in step 14. That is, the case where the image data does not include ID is the case where ID is received from the image forming apparatus 10 and conversion is performed by the dedicated driver module 3531 or the case where ID is received from the image forming apparatus 10 and conversion is performed by the standard driver module 3532.

In these cases, image forming may also be executed.

As described above, in the first exemplary embodiment, even in the case where ID may not be received from the image forming apparatus 10, the image is converted into image data by the dedicated driver module 3531 and the image data is transmitted to the image forming apparatus 10.

This is because, in the communication line 20 between the terminal apparatus 30 and the image forming apparatus 10, the protocol for an inquiry regarding ID and a response (transmission and reception) differs from the protocol via which the image data is transmitted from the terminal apparatus 30 to the image forming apparatus 10. For example, in TCP/IP, image data is transmitted from the terminal apparatus 30 to the image forming apparatus 10 using a protocol such as the Line Printer Daemon protocol (LPR) and the Internet Printing Protocol (IPP) and a TCP port 9100. In contrast, ID is transmitted/received using a protocol such as the Simple Mail Transfer Protocol (SMTP) and the Server Message Block protocol (SMB).

Thus, even when ID may not be transmitted and received due to a failure (a network failure) occurred in the communication line 20, there is a case where image data may be transmitted. Accordingly, even when ID may not be received because of occurrence of a network failure, in the case where image data may be transmitted to the image forming apparatus 10, the user's image forming may be less likely to be interrupted.

Furthermore, as a result of adding ID to image data, in the case where the ID of the image data does not correspond to the ID of the image forming apparatus 10, sheet wastage and time wastage caused by a printing error may be reduced and a user is notified that the printer driver 353 needs to be switched to another printer driver 353, by outputting an error sheet.

The above-described description has been made, supposing that the last mode is the dedicated mode. In the dedicated mode, the dedicated driver module 3531 has been started up. Thereafter, an inquiry regarding ID is made. In the case where the received ID shows that the image forming apparatus 10 supports the dedicated mode, the image is converted into image data by the dedicated driver module 3531.

In this case, the printer driver 353 starts up in the dedicated mode even at the next start-up.

In contrast, in the case where the dedicated driver module 3531 has been switched to the standard driver module 3532, the printer driver 353 starts up in the standard mode at the next start-up.

Figure 8:
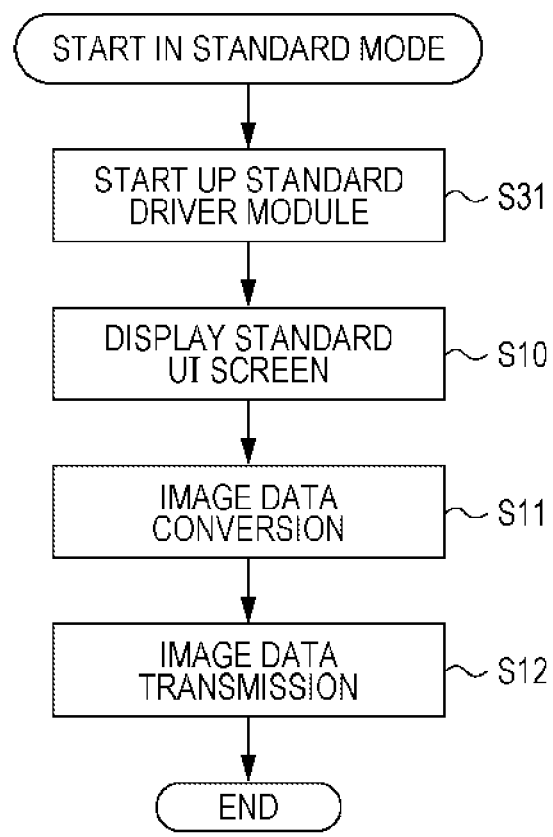
FIG. 8 is a flowchart illustrating an example of an operation of the printer driver in the case where the printer driver is started up in the standard mode.

FIG. 8 is a flowchart illustrating an example of an operation of the printer driver 353 when the printer driver 353 is started up in the standard mode. Note that steps similar to those in the flowchart illustrated in FIG. 4 are denoted by the same reference numerals and description thereof will be omitted.

Since the mode has been switched to the standard mode in the last image forming process, the printer driver 353 is started up in the standard mode. That is, the standard driver module 3532 is started up (Step 31).

Returning back to step 10 of FIG. 4, the standard UI screen 322 is displayed on the display 32 of the terminal apparatus 30 by the standard driver module 3532. Thereafter, the image is converted into image data in step 11, and the image data is transmitted to the image forming apparatus 10 in step 12.

As described above, in the case where the printer driver 353 has been started up in the standard mode, an ID inquiry to the image forming apparatus 10 and the like as in steps 3 to 6 of FIG. 4 are not performed.

This is because there may be a case where the image forming apparatus 10 that is connected does not have a function for responding to an ID inquiry.

In this case, the standard mode is used until the time when the printer driver 353 of the terminal apparatus 30 is switched to a printer driver that has a dedicated mode supported by the image forming apparatus 10, which is connected as a result of switching, or the printer driver that has the dedicated mode is installed.

As described above, in the first exemplary embodiment, the printer driver 353 has the dedicated mode and the standard mode. When the printer driver 353 is started up in the dedicated mode, the printer driver 353 inquires of the image forming apparatus 10 about ID and determines whether or not the image forming apparatus 10 supports the dedicated mode of the printer driver 353. In the case where the image forming apparatus 10 has been switched to another image forming apparatus 10 and the dedicated mode is incapable of being applied, the mode is switched to the standard mode. As a result, even when a user does not recognize that the image forming apparatus 10 has been switched to another image forming apparatus 10, image forming may be performed. In addition, through the message window 323 of the standard UI screen 322 in the standard mode, the user is notified that the image forming apparatus 10 has been switched to another image forming apparatus 10 and the printer driver 353 needs to be switched to another printer driver 353.

In addition, even when the ID of the image forming apparatus 10 may not be received due to occurrence of a network failure or the like, if image data may be transmitted, image forming may be performed. Note that, in the case where the image forming apparatus 10 has been switched to another image forming apparatus 10, it is notified through an error sheet or the like that the printer driver 353 needs to be switched to another printer driver 353.

Next, an operation of the printer driver 353 will be described, the operation being partially different from the operation of the printer driver 353 illustrated in the flowchart of FIG. 4.

In the flowchart illustrated in FIG. 4, when the dedicated driver module 3531 is started up in step 1, the dedicated UI screen 321 is displayed on the display 32 of the terminal apparatus 30 in step 2.

Thereafter, in step 9, in the case where the mode is switched to the standard mode, the dedicated UI screen 321 is closed and the standard UI screen 322 is displayed.

Here, the user sees the dedicated UI screen 321 displayed on the display 32, and then may recognize that the image is converted into image data in the dedicated mode. In particular, when the mode is switched to the standard mode in step 9, in the case where the OK button 324 and the cancel button 325 are not displayed on the display 32 and a command is not requested from the user, the user may recognize that the image has been converted into image data in the dedicated mode.

Thus, a UI screen is displayed after it is determined which of the dedicated mode and the standard mode is to be used to convert the image.

Figure 9:
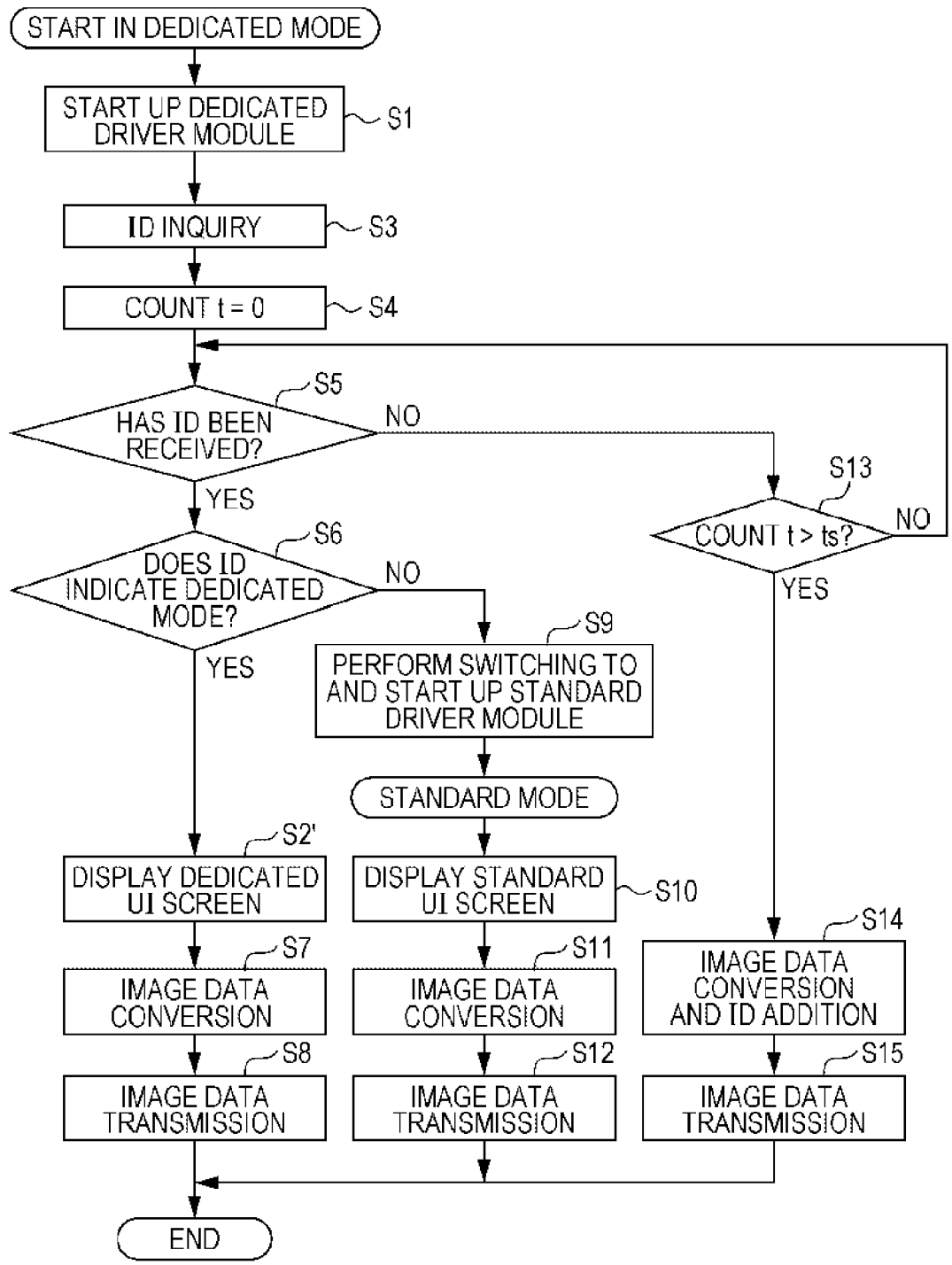
FIG. 9 is a flowchart illustrating a modified example of an operation of the printer driver illustrated in FIG. 4.

FIG. 9 is a flowchart illustrating a modified example of the operation of the printer driver 353 illustrated in FIG. 4. Steps similar to those in the flowchart illustrated in FIG. 4 are denoted by the same reference numerals and description thereof will be omitted.

Here, in the case where step 2 of FIG. 4 is omitted and a positive determination (Yes) has been made in step 6, that is, in the case where it is determined that the image forming apparatus 10 supports the dedicated mode, the dedicated UI screen 321 is displayed on the display 32 of the terminal apparatus 30 (Step 2').

As a result, in the case where the mode is switched from the dedicated mode to the standard mode, the user does not see the dedicated UI screen 321. Thus, the user may less likely misunderstand that the image is converted into image data in the dedicated mode.

Figure 10:
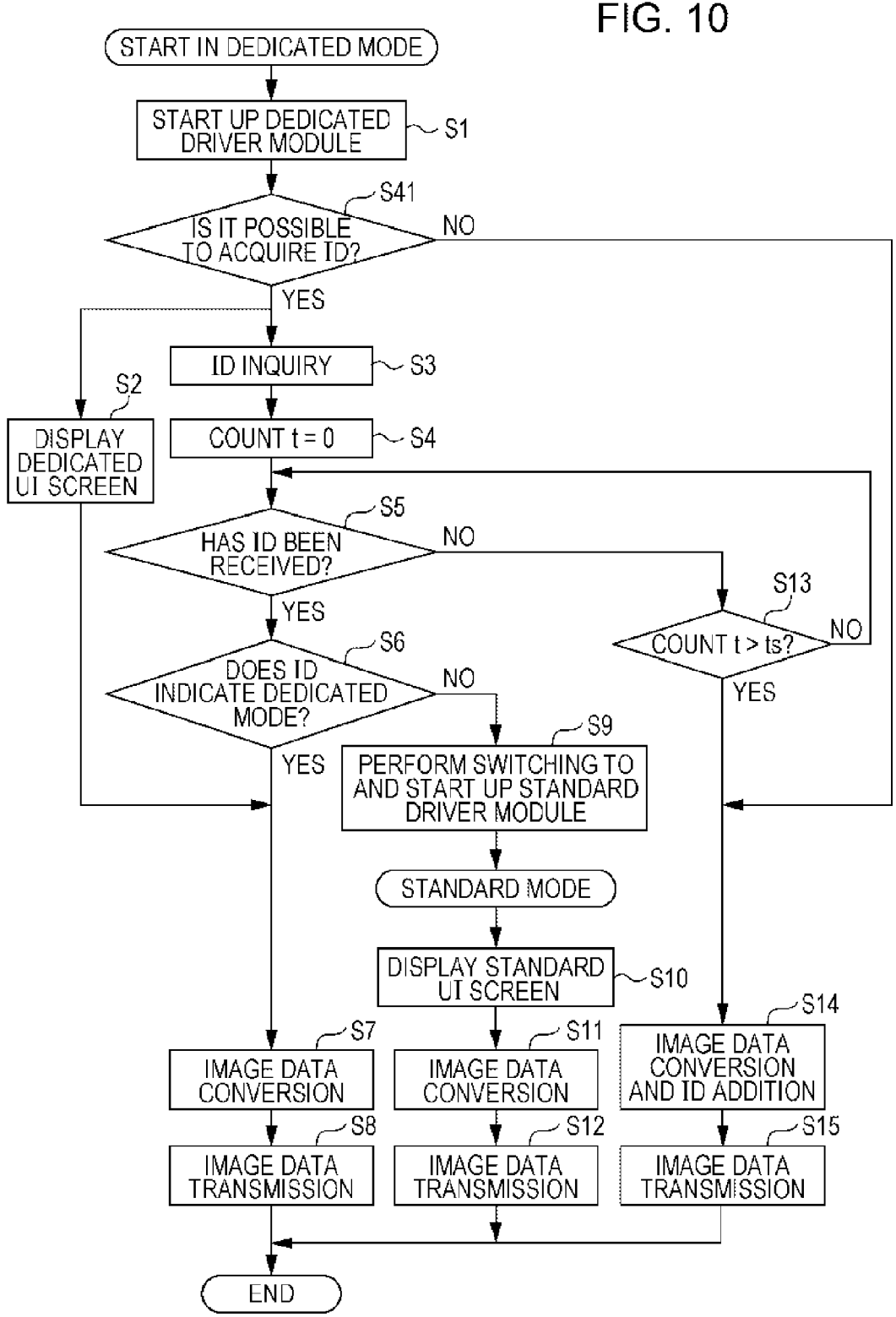
FIG. 10 is a flowchart illustrating another modified example of an operation of the printer driver illustrated in FIG. 4.

FIG. 10 is a flowchart illustrating another modified example of the operation of the printer driver 353 illustrated in FIG. 4. Steps similar to those in the flowchart illustrated in FIG. 4 are denoted by the same reference numerals and description thereof will be omitted.

Here, it is determined whether or not ID may be acquired after the dedicated driver module 3531 has been started up in step 1 of FIG. 4 and before an ID inquiry is made in step 3 of FIG. 4 (Step 41). Here, a connection method for connecting the terminal apparatus 30 to the image forming apparatus 10 and a communication protocol via which communication is established with the image forming apparatus 10 are determined. For example, in the case where the terminal apparatus 30 is connected to the image forming apparatus 10 via USB, IEEE 1284, or the like (local connection) or in the case where the terminal apparatus 30 is connected to the image forming apparatus 10 in a method in which only one-way transmission is allowed, ID may not be acquired from the image forming apparatus 10. Thus, it is determined whether or not ID may be acquired on the basis of a connection method or a communication protocol.

In the case where a positive determination (Yes) has been made in step 41, that is, in the case where it is determined that ID may be acquired, steps 2 and 3 are executed. In contrast, in the case where a negative determination (No) has been made in step 41, that is, in the case where it is determined that ID may not be acquired, the process proceeds to step 14.

Note that, in the case where ID may not be acquired from the image forming apparatus 10 in FIGS. 4, 9, and 10, the image is converted into image data in the dedicated mode, that is, by the dedicated driver module 3531 and the image data is transmitted to the image forming apparatus 10. However, in the case where ID may not be acquired from the image forming apparatus 10, the mode may also be switched to the standard mode, that is, the image may also be converted into image data by the standard driver module 3532 and the image data may be transmitted to the image forming apparatus 10.

Second Exemplary Embodiment

In the first exemplary embodiment, the dedicated mode is supported by one image forming apparatus 10. Here, suppose that the dedicated mode is supported by plural image forming apparatuses 10. Note that, in the following, similarly to as in the first exemplary embodiment, the plural image forming apparatus 10 may be classified in terms of model type or specification. Here, description will be made, supposing that classification is performed in terms of model type.

Figure 11:
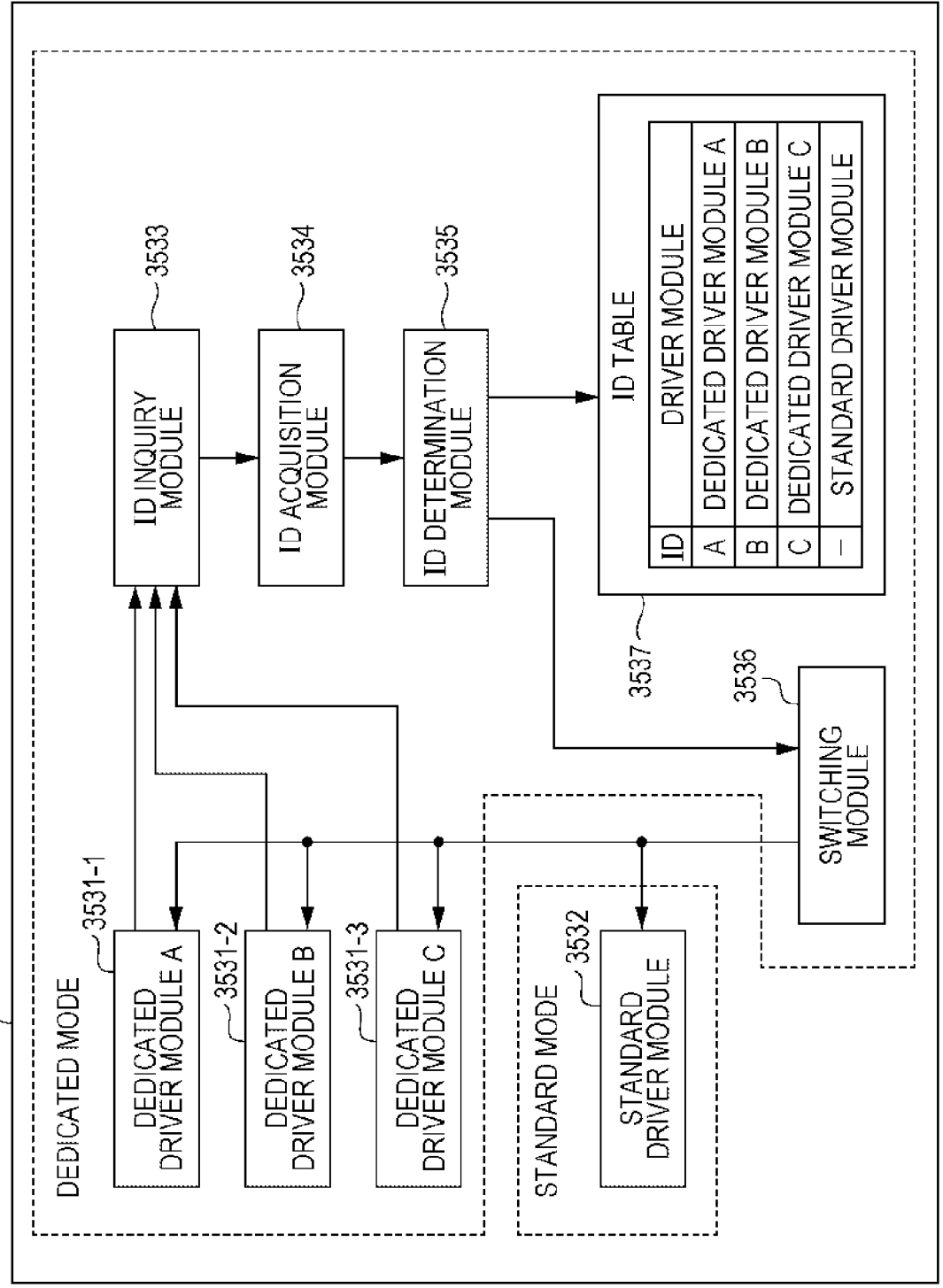
FIG. 11 is a diagram illustrating an example of the configuration of a functional module (a block) in a printer driver to which a second exemplary embodiment is applied.

FIG. 11 is a diagram illustrating an example of the configuration of a functional module (a block) in the printer driver 353 to which the second exemplary embodiment is applied. The printer driver 353 includes a dedicated driver module A3531-1, a dedicated driver module B3531-2, a dedicated driver module C3531-3, and the standard driver module 3532. In the dedicated mode, the dedicated driver module A3531-1 is compatible with a model type A and makes it possible to select functions that the image forming apparatus 10 of the model type A provides and to set settings for the functions. In the dedicated mode, the dedicated driver module B3531-2 is compatible with a model type B and makes it possible to select functions that the image forming apparatus 10 of the model type B provides and to set settings for the functions. In the dedicated mode, the dedicated driver module C3531-3 is compatible with a model type C and makes it possible to select functions that the image forming apparatus 10 of the model type C provides and to set settings for the functions. The standard driver module 3532 makes it possible to select functions that are common for predetermined image forming apparatuses 10 of plural model types that include the model types A, B, and C and to set settings for the functions.

Note that, in the case where the dedicated driver modules A3531-1, B3531-2, and C3531-3, and the standard driver module 3532 do not need to be distinguished from each other, they are referred to as driver modules.

Similarly to as in the first exemplary embodiment, the printer driver 353 includes the ID inquiry module 3533, the ID acquisition module 3534, the ID determination module 3535, and the switching module 3536. The ID inquiry module 3533 inquires of the image forming apparatus 10 about ID.

The ID acquisition module 3534 receives ID from the image forming apparatus 10. The ID determination module 3535 determines ID received from the image forming apparatus 10. The switching module 3536 performs switching from a driver module to another. Note that, the switching module 3536 performs switching between the dedicated driver modules A3531-1, B3531-2, and C3531-3, and the standard driver module 3532.

Furthermore, the printer driver 353 includes an ID table 3537 that shows a relationship between the ID of an image forming apparatus 10 and a driver module corresponding to the ID. In FIG. 11, IDs are denoted by "A", "B", and "C", which are numerals representing a model type. FIG. 11 illustrates a relationship between each of the IDs and a driver module corresponding to the ID. Note that the ID of the standard driver module 3532 is denoted by "-".

That is, the IDs of image forming apparatuses 10 compatible with the respective dedicated driver modules A3531-1, B3531-2, and C3531-3 are stored in the ID table 3537.

In the following description, "X" represents either of "A", "B", and "C". "X'" represents either of "A", "B", and "C" that is not represented as "X".

Thus, in the case where either of the dedicated driver modules A3531-1, B3531-2, and C3531-3 is indicated as the dedicated driver module X, the dedicated driver module is referred to as the dedicated driver module X. In the case where either of the dedicated driver modules A3531-1, B3531-2, and C3531-3 is indicated as the dedicated driver module X', the dedicated driver module is referred to as the dedicated driver module X'.

The dedicated driver modules A3531-1, B3531-2, and C3531-3 may display, as a UI screen, an A-dedicated UI screen, a B-dedicated UI screen, and a C-dedicated UI screen, respectively. In the case where either of the dedicated driver modules A3531-1, B3531-2, and C3531-3 is referred to as the dedicated driver module X, a corresponding one of the A-dedicated UI screen, the B-dedicated UI screen, and the C-dedicated UI screen is referred to as an X-dedicated UI screen. In the case where either of the dedicated driver modules A3531-1, B3531-2, and C3531-3 is referred to as the dedicated driver module X', a corresponding one of the A-dedicated UI screen, the B-dedicated UI screen, and the C-dedicated UI screen is referred to as an X'-dedicated UI screen.

Figure 12:
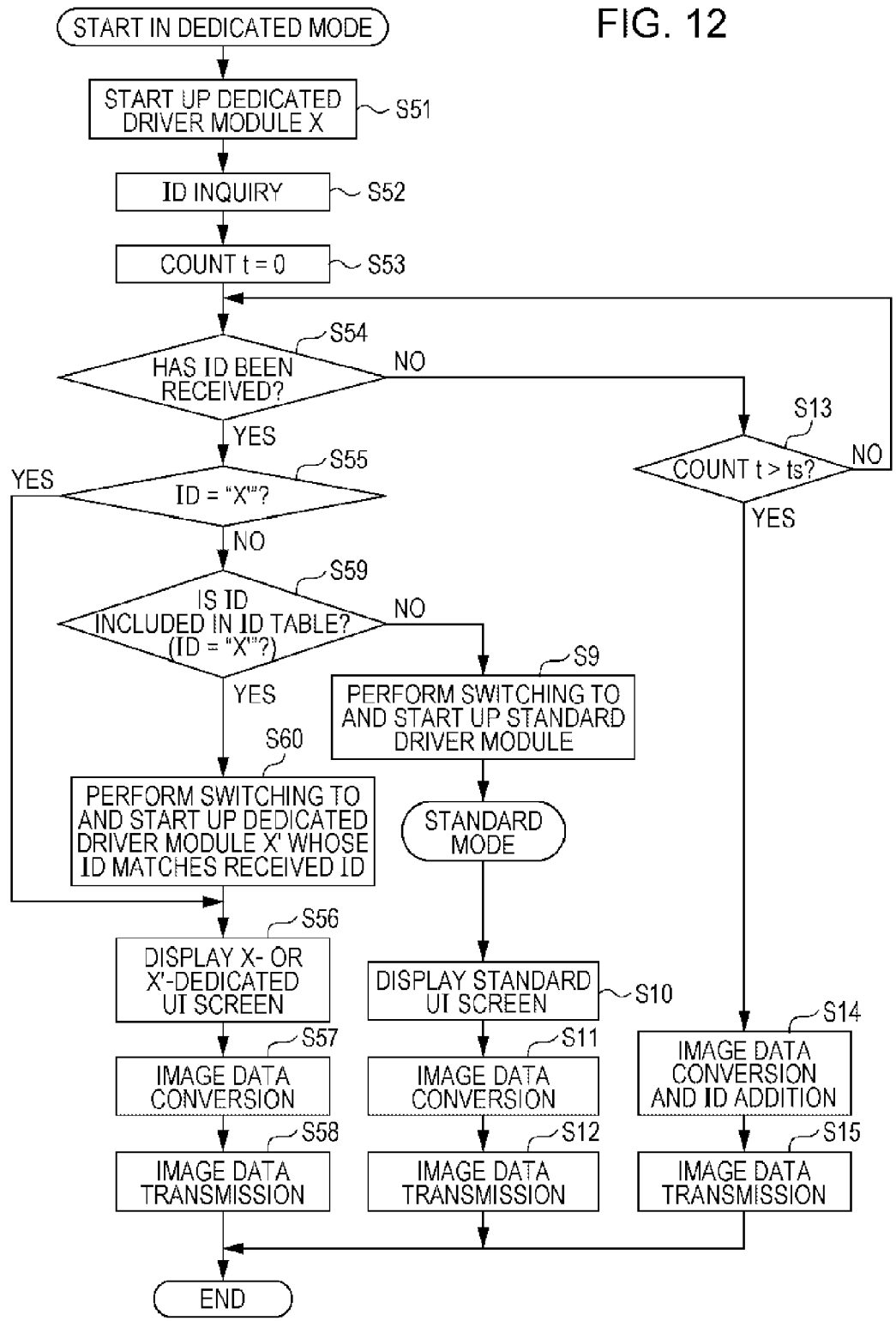
FIG. 12 is a flowchart illustrating an example of an operation of the printer driver in the second exemplary embodiment.

FIG. 12 is a flowchart illustrating an example of an operation of the printer driver 353 in the second exemplary embodiment. Note that steps similar to those in the flowchart illustrated in FIG. 4 are denoted by the same reference numerals and description thereof will be omitted.

Similarly to as in the first exemplary embodiment, suppose that the last mode is the dedicated mode, and the printer driver 353 stores the dedicated mode. Here, suppose that an image has been converted into image data by the dedicated driver module X in the dedicated mode, which is the last mode.

Suppose that a user creates an image in the terminal apparatus 30 and commands image forming to be performed by the image forming apparatus 10.

In the following, with reference to FIG. 11, an operation of the printer driver 353 will be described using FIG. 12.

Since the last mode is the dedicated mode, the dedicated driver module X in the printer driver 353 (either of the dedicated driver modules A3531-1, B3531-2, and C3531-3) is started up (Step 51).

Next, the ID inquiry module 3533 inquires of the image forming apparatus 10 about ID (Step 52).

Here, the count t of the timer that measures an elapsed time is set to "0" (timer setting) (Step 53). Thereafter, the timer increases the count t as time goes on.

Next, it is determined by the ID acquisition module 3534 whether or not ID has been received from the image forming apparatus 10 (Step 54).

In the following, the case where a positive determination (Yes) has been made in step 54 will be described. In the case where a negative determination (No) has been made in step 54, steps 13 to 15 illustrated in FIG. 4 are executed. Thus, description thereof will be omitted.

In the case where a positive determination (Yes) has been made in step 54, that is, in the case where ID has been received by the ID acquisition module 3534, it is determined by the ID determination module 3535 whether or not the ID received from the image forming apparatus 10 matches the ID of the image forming apparatus 10 compatible with the dedicated driver module X that has been started up in the dedicated mode (whether or not ID="X") (Step 55).

In the case where a positive determination (Yes) has been made in step 55, that is, in the case where the ID is determined to be "X", the X-dedicated UI screen is displayed on the display 32 of the terminal apparatus 30 by the dedicated driver module X (Step 56). Thereafter, the image created by the user is converted into image data (Step 57). The image data is transmitted to the image forming apparatus 10 (Step 58).

Note that in the case where the user inputs commands for forming an image such as selection of a sheet and specification of a magnification through the input unit 33 by referring to the X-dedicated UI screen displayed on the display 32 of the terminal apparatus 30, a control command based on these commands is added to the image data.

In contrast, in the case where a negative determination (No) has been made in step 55, that is, in the case where the ID received from the image forming apparatus 10 is not "X", it is determined by the ID determination module 3535 whether or not the received ID is described in the ID table 3537 by referring to the ID table 3537 (Step 59).

In the case where a positive determination (Yes) has been made in step 59, that is, in the case where the received ID is not "X" but "X'" and described in the ID table 3537 (either of "A", "B", and "C", but not "X"), switching is performed from the dedicated driver module X to the dedicated driver module X' by the switching module 3536 and the dedicated driver module X' whose ID matches the ID received from the image forming apparatus 10 is started up (Step 60).

The X'-dedicated UI screen is displayed on the display 32 of the terminal apparatus 30 by the dedicated driver module X' (Step 56). Thereafter, the image created by the user is converted into image data by the dedicated driver module X' (Step 57). The image data is transmitted to the image forming apparatus 10 (Step 58).

Note that in the case where a negative determination (No) has been made in step 59, that is, in the case where the received ID of the image forming apparatus 10 is not included in the ID table 3537, the process proceeds to step 9 of FIG. 4 and the mode is shifted to the standard mode. Display of the standard UI screen 322 in step 10 and conversion of image data of the image in step 11 are executed. In step 12, the image data is transmitted to the image forming apparatus 10.

Note that, similarly to as in the first exemplary embodiment, when the standard mode is executed, in the case where the printer driver 353 is started up at the next start-up, the printer driver 353 is started up in the standard mode.

That is, the printer driver 353 in the second exemplary embodiment has the dedicated mode supported by the image forming apparatuses 10 of plural model types. Thus, in the case where one of these image forming apparatuses 10 has been connected as a result of switching, the functions of the image forming apparatus 10 may be selected and settings may be set for the functions.

For example, in the case where there are plural model types that are simultaneously put on the market at a certain timing, when the printer driver 353 is configured to include dedicated driver modules of respective model types, there is no need to prepare printer drivers 353 of respective model types. That is, the printer driver 353 is easily managed.

Note that the modified example and the other modified examples described in the first exemplary embodiment may also be applied to the second exemplary embodiment.

Furthermore, in the case where ID may not be acquired from the image forming apparatus 10, the mode may be switched to the standard mode, that is, the image may be converted into image data by the standard driver module 3532 and the image data may be transmitted to the image forming apparatus 10.

The above-described description has been made, supposing that the terminal apparatus 30 is connected to the image forming apparatus 10 with the communication line 20.

However, there may be a case where there is a server (a server 40 of FIG. 13, which will be described later) between the terminal apparatus 30 and the image forming apparatus 10. In the following, this case will be described.

FIGS. 13A and 13B are diagrams illustrating a case where the server 40 is arranged between the image forming apparatus 10 and the terminal apparatus 30. FIG. 13A illustrates a case where the terminal apparatus 30 is densely coupled to the server 40 and the ID of the image forming apparatus 10 may be returned in response to an ID inquiry (the server 40 is referred to as a server 40A). FIG. 13B illustrates a case where the terminal apparatus 30 is loosely coupled to the server 40 and the ID of the image forming apparatus 10, which is connected, may not be returned in response to an ID inquiry (the server 40 is referred to as a server 40B).

The server 40A illustrated in FIG. 13A includes a cooperating unit 41 that cooperates with the printer driver 353 of the terminal apparatus 30. In this case, in step 3 and the like in the flowchart of FIG. 4, when an ID inquiry is received from the ID inquiry module 3533 in the printer driver 353 of the terminal apparatus 30, the server 40A may return (transmit) the ID of the image forming apparatus 10, which is connected. That is, step 6 of FIG. 4 is executed.

In contrast, the server 40B illustrated in FIG. 13B does not cooperate with the printer driver 353 of the terminal apparatus 30 and has only a function for transmitting received image data to the image forming apparatus 10. Thus, even when the printer driver 353 of the terminal apparatus 30 (the ID inquiry module 3533) inquires of the server 40B about ID of the image forming apparatus 10, the server 40B may not respond to the terminal apparatus 30.

In such a case, step 14 is executed in the flowchart of FIG. 4. The printer driver 353 of the terminal apparatus 30 transmits image data to which ID has been added, to the server 40B.

Accordingly, as illustrated in FIG. 6, whether or not ID is included in image data is determined in the image forming apparatus 10 and image forming is performed.

As described above, the first and second exemplary embodiments may be similarly executed even when the server 40 is arranged between the terminal apparatus 30 and the image forming apparatus 10.

Thus, even in the case where the image forming apparatus 10 has been switched to another image forming apparatus 10 and the printer driver 353 has not yet been switched by a user to a printer driver 353 compatible with the other image forming apparatus 10, sheet wastage and time wastage caused by a printing error may be reduced and the user is notified that the printer driver 353 needs to be switched to a printer driver 353 compatible with the other image forming apparatus 10.

Note that after the printer driver 353 has entered the standard mode, the printer driver 353 may further be used in the standard mode.

The first and second exemplary embodiments have been described, supposing that the printer driver 353 stores the last mode used when an image is converted into image data and, in the case where the printer driver 353 is started up at the next start-up, the printer driver 353 is started up in the last mode. However, every time the printer driver 353 is started up, the printer driver 353 may also be started up in the dedicated mode. That is, the dedicated driver module 3531 may also be started up in the first exemplary embodiment and the dedicated driver module A3531-1 may also be started up in the second exemplary embodiment.

By performing this, even when the last mode is the standard mode, in the case where the image forming apparatus 10 is switched to another image forming apparatus 10 again, the mode may return to the dedicated mode.

Furthermore, the first and second exemplary embodiments have been described, supposing that, in the case where ID is not received from the image forming apparatus 10, the ID of the image forming apparatus 10 that supports the dedicated mode of the printer driver 353 is added to the image data in step 14. However, even in the case where ID is received from the image forming apparatus 10, the ID of the image forming apparatus 10 that supports the dedicated mode of the printer driver 353 may also be added to the image data. In addition, even in the case where the printer driver 353 has entered the standard mode, ID indicating the standard mode may also be added to the image data.

By performing this, in the case where image data, which has been delayed, is received by the image forming apparatus 10, in the case where image data is stored in the server 40, or the like, even when the image forming apparatus 10 is switched to another image forming apparatus 10, the other image forming apparatus 10 may recognize the image data.

In addition, steps 4 and 12 in the first exemplary embodiment and steps 53 and 12 in the second exemplary embodiment have been described, supposing that the count t increases; however, a predetermined count number may be set to t in advance and the count t may be decreased as time goes on.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal apparatus comprising:
a driver that includes a switching unit and that has a dedicated mode and a standard mode, the dedicated mode providing all functions of a predetermined image forming apparatus to be selected, the standard mode providing a function common for a plurality of image forming apparatuses to be selected;
an inquiry module unit configured to inquire about identification information of the image forming apparatus in response to the dedicated mode being started; and
an output unit that outputs when the switching unit does not perform switching and image data is output in the dedicated mode in a case where the identification information is incapable of being acquired from the connected image forming apparatus, identification information of an image forming apparatus corresponding to the dedicated mode, wherein
the switching unit is configured to perform switching from the dedicated mode to the standard mode in a case where it is determined that the dedicated mode is inapplicable after the dedicated mode has been started up, wherein
the driver further includes an acquiring unit that acquires identification information preset in and transmitted from a connected image forming apparatus, and wherein
it is determined whether or not the dedicated mode is applicable, on the basis of the identification information acquired by the acquiring unit.

2. The terminal apparatus according to claim 1, wherein
in a case where the identification information is incapable of being acquired from the connected image forming apparatus, the switching unit performs switching from the dedicated mode to the standard mode and image data is output in the standard mode.

3. The terminal apparatus according to claim 1, wherein
as to whether or not the identification information has been acquired from the connected image forming apparatus, in a case where a time for which the identification information is incapable of being acquired has exceeded a preset time, it is determined that the identification information is incapable of being acquired.

4. The terminal apparatus according to claim 2, wherein
as to whether or not the identification information has been acquired from the connected image forming apparatus, in a case where a time for which the identification information is incapable of being acquired has exceeded a preset time, it is determined that the identification information is incapable of being acquired.

5. A non-transitory computer readable medium storing a program causing a processor of a terminal apparatus to execute a process, the process comprising:
communicating with an image forming apparatus;
determining if a dedicated mode is inapplicable;
inquiring about identification information of the image forming apparatus in response to the dedicated mode has been started; and
performing switching from the dedicated mode to a standard mode in a case where it is determined that the dedicated mode is inapplicable, the dedicated mode providing all functions of a predetermined image forming apparatus, the standard mode making it possible to use a function common for a plurality of image forming apparatuses;
outputting, when the switching unit does not perform switching and image data is output in the dedicated mode in a case where the identification information is incapable of being acquired from the connected image forming apparatus, identification information of an image forming apparatus corresponding to the dedicated mode; and
acquiring identification information preset in and transmitted from a connected image forming apparatus, wherein
the determining of whether or not the dedicated mode is applicable occurs on the basis of the acquired identification information.

6. The terminal apparatus according to claim 1, wherein
in a case where the driver has been started up in the dedicated mode, transmission of identification information is requested from a connected image forming apparatus, and in a case where the driver has been started up in the standard mode, transmission of identification information is not requested from a connected image forming apparatus.

7. The terminal apparatus according to claim 1, wherein
the switching unit closes a user interface screen for the dedicated mode and displays a user interface screen for the standard mode.

* * * * *